US006686909B1

United States Patent
Endo

(10) Patent No.: US 6,686,909 B1
(45) Date of Patent: Feb. 3, 2004

(54) TOUCH PANEL INPUT COORDINATE TRANSFORM DEVICE AND METHOD OF TRANSFORMING A TOUCH PANEL INPUT COORDINATE

(75) Inventor: Kazuo Endo, Shizuoka (JP)

(73) Assignee: NEC Corporation, Tokyo (JP)

( * ) Notice: Subject to any disclaimer, the term of this patent is extended or adjusted under 35 U.S.C. 154(b) by 26 days.

(21) Appl. No.: 09/716,455

(22) Filed: Nov. 21, 2000

(30) Foreign Application Priority Data

Nov. 22, 1999 (JP) ........................... 11-331606

(51) Int. Cl.⁷ ............................. G09G 5/00; G06F 12/10
(52) U.S. Cl. ...................... 345/173; 345/649; 345/656
(58) Field of Search .................. 345/169, 649, 345/650, 654, 665, 656, 173–178; 235/472; 178/18.01–18.07

(56) References Cited

U.S. PATENT DOCUMENTS

| 4,611,232 A | * | 9/1986 | Searby ........................ 358/160 |
| 5,030,944 A | * | 7/1991 | Masimo et al. ............. 345/659 |
| 5,095,422 A | * | 3/1992 | Horiguchi .................... 340/727 |
| 5,656,804 A | * | 8/1997 | Barkan et al. .............. 235/472 |
| 5,664,077 A | * | 9/1997 | Kubo .......................... 345/421 |
| 5,737,618 A | * | 4/1998 | Nakayama et al. .......... 345/649 |
| 5,798,750 A | * | 8/1998 | Ozaki .......................... 345/173 |
| 5,917,469 A | * | 6/1999 | Matsushita .................. 345/629 |
| 6,188,802 B1 | * | 2/2001 | Usuda et al. ............... 345/649 |
| 6,301,397 B1 | * | 10/2001 | Jankowski et al. ......... 345/469 |
| 6,353,434 B1 | * | 3/2002 | Akebi et al. ................ 345/173 |
| 6,407,746 B1 | * | 6/2002 | Tanizawa .................... 345/649 |

FOREIGN PATENT DOCUMENTS

| JP | 04-134493 | 5/1992 |
| JP | 6-171516 | 6/1994 |
| JP | 8-305494 | 11/1996 |

* cited by examiner

Primary Examiner—Bipin Shalwala
Assistant Examiner—David L. Lewis
(74) Attorney, Agent, or Firm—Sughrue Mion, PLLC

(57) ABSTRACT

A touch panel input coordinate transform device is provided which detects coordinate data supplied to a touch panel and transforms the coordinate data according to a rotation angle by which images on the display unit are rotated. Further, decision is made about the rotation angle of the images either at the time point when an origin is registered or at the time point when an operator touches the touch panel.

10 Claims, 4 Drawing Sheets

TOUCH PANEL INPUT COORDINATE TRANSFORM DEVICE AND METHOD OF TRANSFORMING A TOUCH PANEL INPUT COORDINATE

BACKGROUND OF THE INVENTION

1. Field of the Invention

The invention relates to a touch panel input coordinate transform device and a method of transforming a touch panel input coordinate and, in particular, to the device and the method which are suitable for rotating displayed images.

2. Description of the Related Art

In the prior art, a touch panel input system has a touch panel module and a display unit. The touch panel module includes an origin register unit which registers an origin and a transform unit which transforms physical coordinates touched into logical coordinates by using origin information representative of the origin.

When the touch operation is carried out on the physical coordinates drawn on the display unit, the transform unit transforms the physical coordinates into the logical coordinates using the information on the origin and transfers the transformed logical coordinates to an input control unit as input coordinates.

However, a conventional touch panel system must register the origin again each time when images displayed on the display unit are rotated. This is because data touched and input on physical coordinates after the rotation of the images are merely transformed into logical coordinates which are defined before the rotation and which are different from those after the rotation.

SUMMARY OF THE INVENTION

Therefore, it is an object of the invention to provide a touch panel system which requires no origin registration even if images displayed are rotated.

According to a first aspect of the invention, there is provided a touch panel input coordinate transform device. The device comprises a first storage unit which stores first rotation information on images displayed on a display including a touch panel when an origin of the touch panel is registered, a second storage unit which stores second rotation information on images currently displayed on the display, a comparison unit which compares the first rotation information with the second rotation information when a touch operation is performed onto the touch panel, and determines a difference between them, and a transform unit which transforms coordinates where the touch operation is performed, on the basis of the difference when the contents of the first rotation information is different from the contents of the second rotation information.

According to a second aspect of the invention, there is provided a method of transforming a touch panel input coordinate. The method comprises the steps of storing, in a first storage unit, first rotation information on images displayed on a display including a touch panel when an origin of the touch panel is registered, comparing the first rotation information with second rotation information stored in a second storage unit when a touch operation is performed onto the touch panel, and determining a difference between them, and transforming coordinates where the touch operation is performed, on the basis of the difference when the contents of the first rotation information is different from the contents of the second rotation information.

According to a third aspect of the invention, there is provided a recording medium readable by a computer, tangibly embodying a program of instructions executable by the computer to perform a method of transforming a touch panel input coordinate. And the method comprises the steps of storing, in a first storage unit, first rotation information on images displayed on a display including a touch panel when an origin of the touch panel is registered, comparing the first rotation information with second rotation information stored in a second storage unit when a touch operation is performed onto the touch panel, and determining a difference between them, and transforming coordinates where the touch operation is performed, on the basis of the difference when the contents of the first rotation information is different from the contents of the second rotation information.

DESCRIPTION OF THE PREFERRED EMBODIMENT

Figure 1:
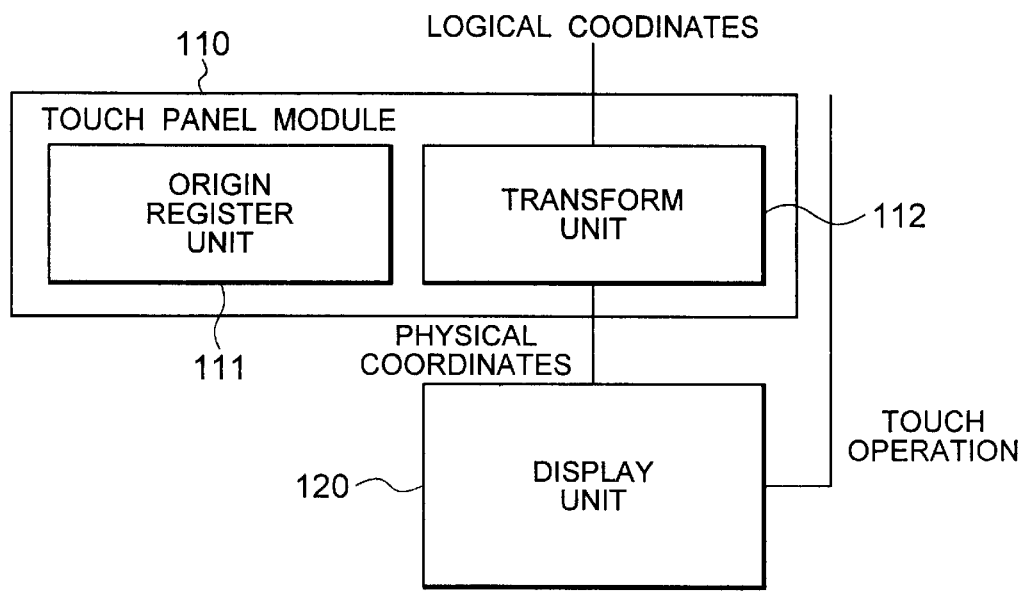
FIG. 1 shows a block diagram of a conventional touch panel input coordinate transform device.

At first, illustration is made about the above described conventional touch panel system with reference to FIG. 1.

In FIG. 1, a touch panel input system includes a touch panel module 110 and a display unit 120. The touch panel module 110 includes an origin register unit 111 and a transform unit 112.

When an operator touches a part of a display image on a screen, the display unit 120 detects it and supplies physical coordinates representing a position where the operator touches, for example, by a finger. The transform unit 112 receives the physical coordinates and then, transforms the physical coordinates into the logical coordinates using the information of the origin which is registered by the origin register unit 111 in advance. The logical coordinates are transferred to an input control unit (not shown) as input coordinates.

Figure 2:
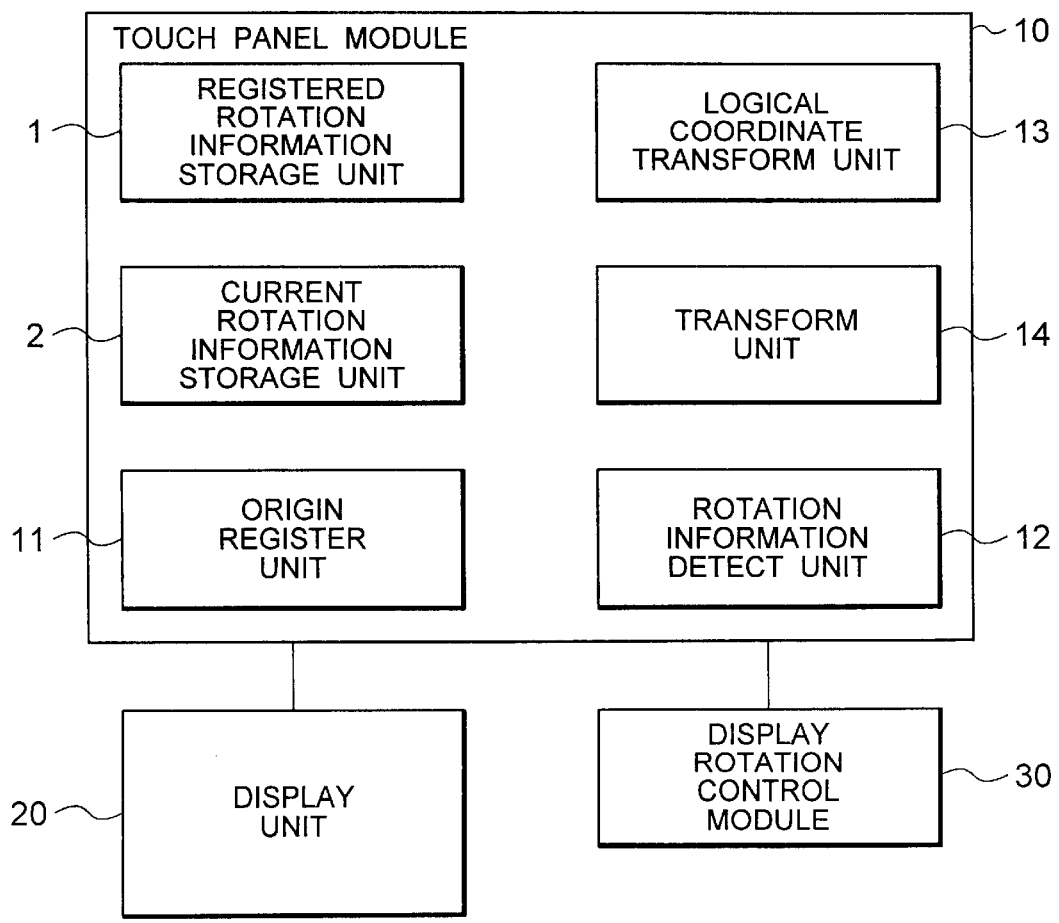
FIG. 2 shows a block diagram for use in describing an embodiment of a touch panel system of the invention.

Next, description is made about a configuration of a touch panel input coordinate transform device of the invention with reference to FIG. 2. In FIG. 2, the device includes a touch panel module 10, a display unit 20, and a display rotation control module 30.

The touch panel module 10 includes a registered rotation information storage unit 1 which stores display rotation information when an origin is registered and a current rotation information storage unit 2 which stores a current display rotation information. In addition, an origin register unit 11 performs an origin registration operation while a rotation information detect unit 12 which detects the current display rotation information. Furthermore, a logical coordinate transform unit 13 transforms logical coordinates into logical coordinates based on a current display direction, and a transform unit 14 transforms physical coordinates where a touch operation is performed into logical coordinates using origin information registered by the origin register unit 11.

Herein, the display unit 20 may be, for example, a CRT display device incorporating a touch panel for sensing a finger touch. Alternatively, the display unit 20 may be structured by a normal monitor, such as a CRT display, an LCD monitor, and an individual sensing film attached to the normal monitor to sense a human touch.

The display rotation control module 30 serves to change a direction of images displayed on the display unit 20, with a direction of the display unit 20 kept unchanged, and to notify of the changed direction of images.

As mentioned before, it is noted that the direction of the display unit 20, that is, the direction of the hardware monitor is not changed.

But, there are monitors which are capable of physically rotating ,such as an LCD monitor. In this case, the device of the invention is also applied to such rotatable monitors in a similar way if the physical rotation angle of the monitor can be transferred to the touch panel module 10.

Also, the origin registration operation is performed, for example, by registering, as an origin (0,0), a physical point located at the bottom and leftmost position of images on the display screen.

Figures 3A, 3B, 3C, 3D:
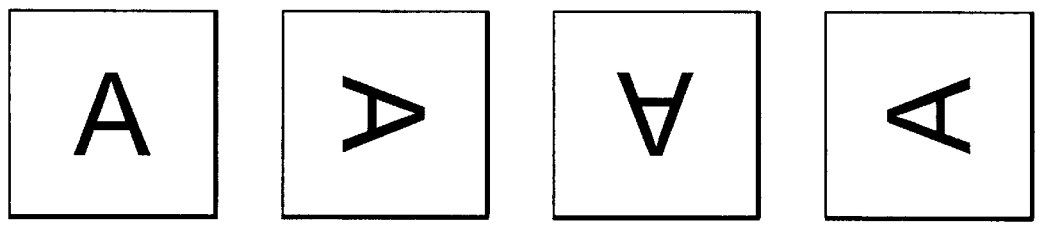
FIGS. 3A–3D show examples of images rotated on a display unit.

Images displayed on the display unit 20 may be rotated as shown in FIGS. 3A through 3D. But, an available rotation angle may not be limited to the examples. In FIG. 3A, images (representing character "A") are normal and not rotated. That is, a rotation angle is equal to 0 degree. In FIG. 3B, the images are rotated clockwise by an angle of 90 degrees from the angle of the images shown in FIG. 3A.

In FIG. 3C, the images are rotated clockwise by an angle of 180 degrees from the rotation angle of the images shown in FIG. 3A and in FIG. 3D, the images are rotated clockwise by an angle of 270 degrees from the rotation angle of the images shown in FIG. 3A.

The rotation of the images displayed on the display unit 20 can be controlled according to an instruction of the operator by the use of the display rotation control module 30 shown in FIG. 2.

When the rotation angle of the images is changed, the changed rotation angle is detected by the rotation information detect unit 12 and stored into the current rotation information storage unit 2.

Figure 4:
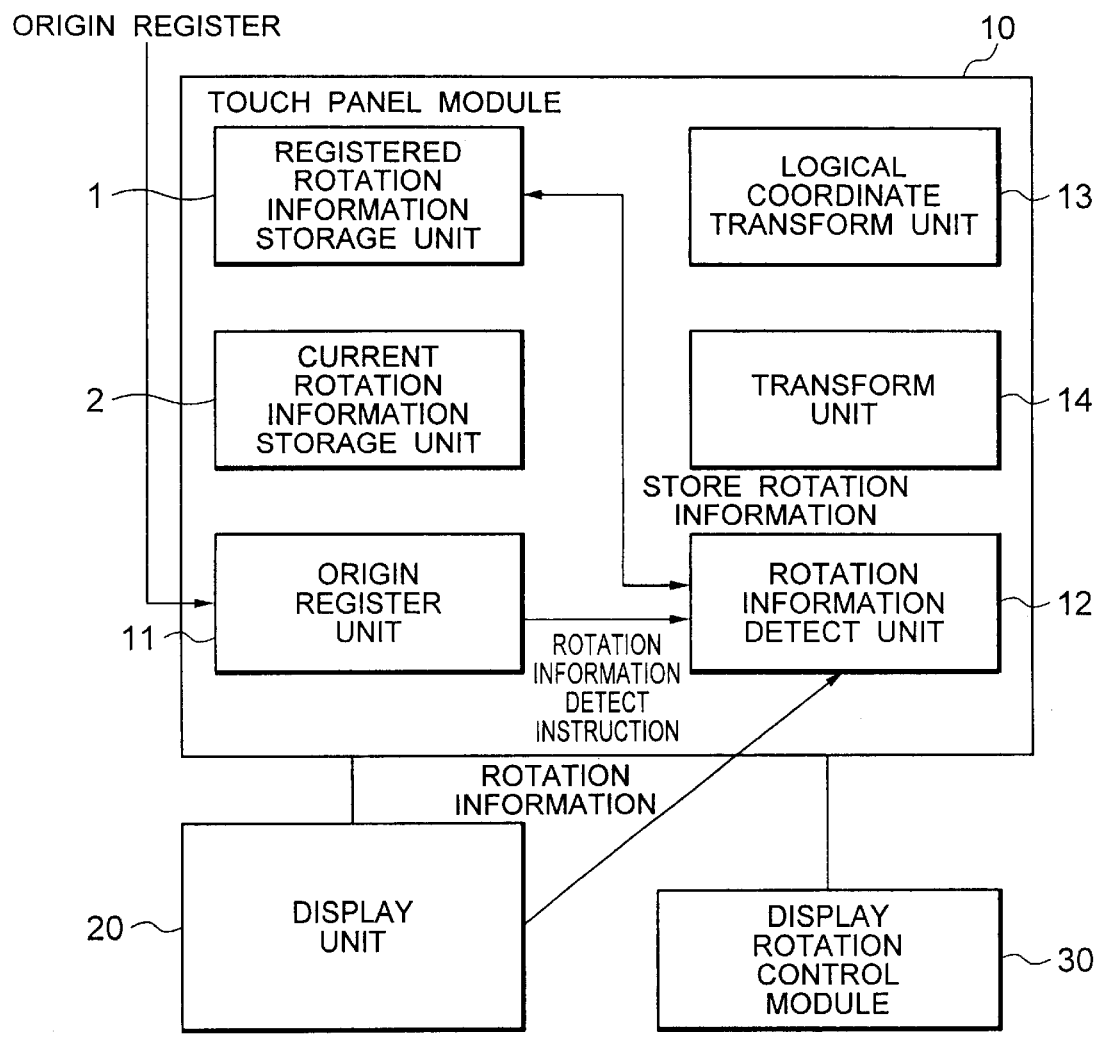
FIG. 4 shows a diagram for use in describing an origin registration operation of the invention.
Figure 5:
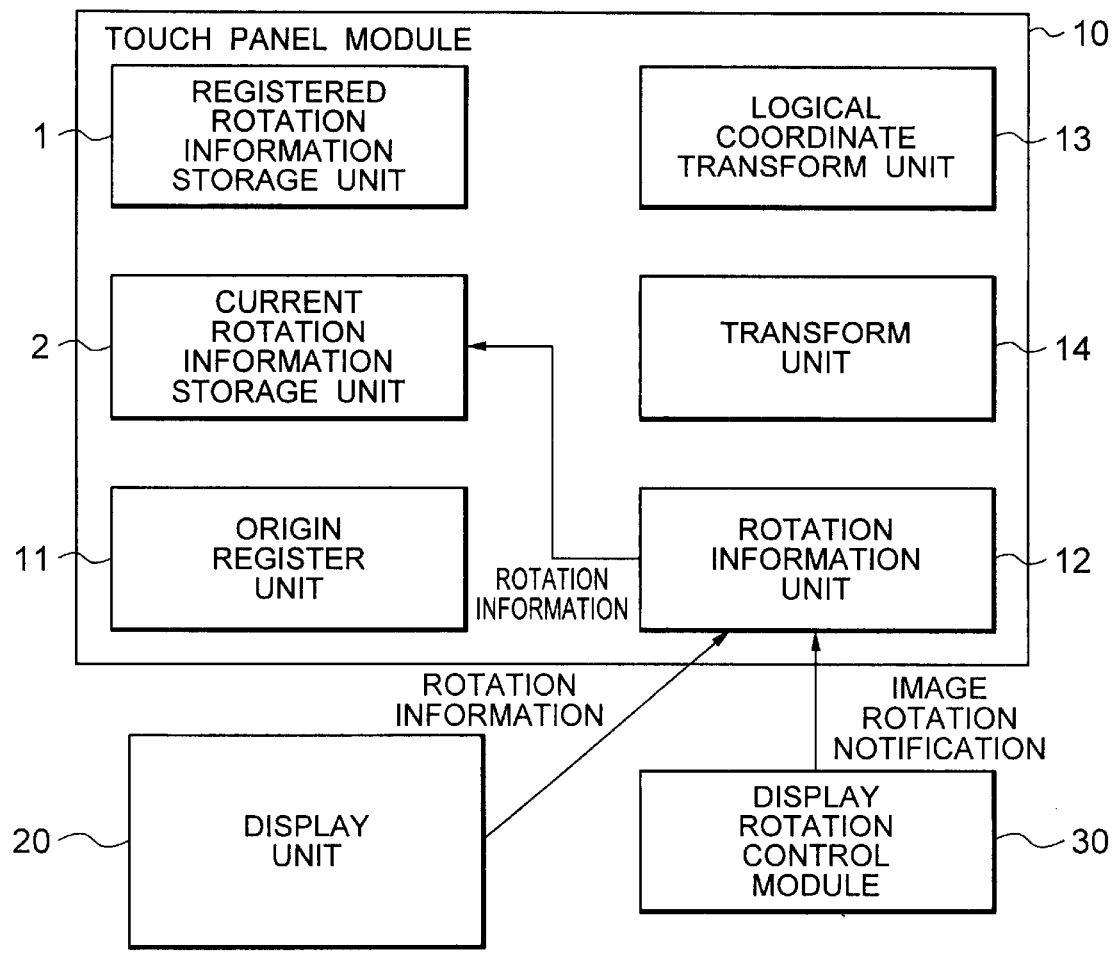
FIG. 5 shows a diagram representing an image rotation operation of the invention.
Figure 6:
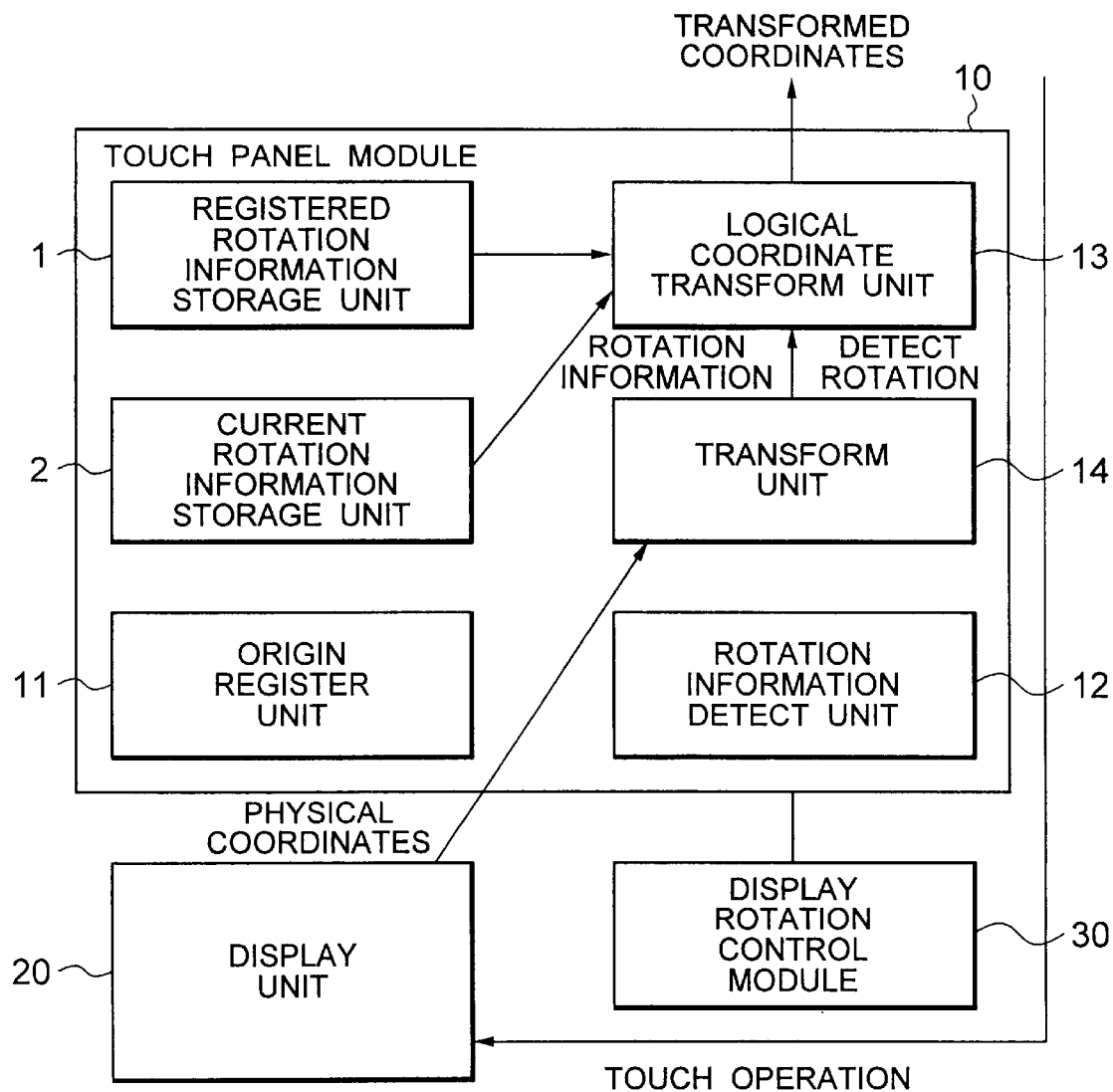
FIG. 6 shows a diagram representing a coordinate transform operation of the invention.

Then, description is made about operations of the touch panel input coordinate transform device with reference to FIGS. 4 through 6.

In FIG. 4, when an operator performs an origin registration operation about a touch panel, the origin register unit 11 registers the origin of the touch panel.

When the origin registration operation is completed, the origin register unit 11 instructs the rotation information detect unit 12 to start.

The rotation information detect unit 12 detects, from the display unit, the rotation information of images displayed on the display unit 20 at the origin registration operation. The detected rotation information may include, for example, an angle of 0 degree, an angle of 90 degrees, an angle of 180 degrees, or an angle of 270 degrees as described above. Then the rotation information detect unit 12 stores the rotation information into the registered rotation information storage unit 1.

Next, in FIG. 5, the display rotation control module 30 rotates the images displayed on the display unit 20 according to the operator's instruction. At this point, the display rotation control module 30 notifies the touch panel module 10 of the fact that the images is rotated. Then, in the touch panel module 10, the rotation information detect unit 12 detects current rotation information representative of a rotation angle of the images displayed on the display unit 20 and stores the information in the current rotation information storage unit 2.

In FIG. 6, when the operator touches the display unit 20, the transform unit 14 detects physical coordinates on the display unit 20 and transforms the physical coordinates into the logical coordinates using the information of the origin registered by the origin register unit 11.

Next, the logical coordinate transform unit 13 receives the logical coordinates from the transform unit 14 and determines a rotation angle of the images displayed on the display unit 20. Such decision is made after the origin is registered, by using both the rotation information stored in the registered rotation information storage unit 1 and the current rotation information stored in the current rotation information storage unit 2.

When it is determined that the images on the display unit 20 are rotated after the origin registration, that is, when the determined rotation angle is not zero, the logical coordinate transform unit 13 transforms the received logical coordinates into logical coordinates which reflect rotation of the images, using the determined rotation angle.

The resulting logical coordinates are supplied to an input control unit (not shown).

On the other hand, when it is determined that the images on the display unit 20 are not rotated after the origin registration, that is, when the determined rotation angle is zero, the logical coordinate transform unit 13 directly sends the received logical coordinates to the control unit.

As described above, in the invention, coordinate data supplied to the touch panel are transformed according to a rotation angle by which the images on the display unit are rotated. Therefore, there is no need to register an origin every time the images are rotated.

According to the invention, decision is made about a rotation angle of the images on the display unit either at the time point when an origin is registered or at the time point when an operator touches a touch panel. And logical coordinates transformed from physical coordinates are further transformed based on the difference between the two rotation angles.

What is claimed is:

1. A touch panel input coordinate transform device comprising:

an origin register unit which registers information of an origin of a touch panel as origin information;

a first storage unit which stores first rotation information based on images displayed on a display, when the origin of the touch panel is registered;

a first transform unit which transforms physical coordinates touched on the touch panel into first logical coordinates using the origin information;

a rotation control module which rotates the images;

a second storage unit which stores second rotation information based on the images currently displayed on the display;

a comparison unit which compares the first rotation information with the second rotation information when a touch operation is performed onto the touch panel, and determines a difference between the first rotation information and the second rotation information; and a second transform unit which transforms the first logical coordinates into second logical coordinates, on the basis of the difference, when the contents of the first rotation information are different from the contents of the second rotation information, and which supplies the second logical coordinates to an input control unit.

2. The touch panel input coordinate transform device of claim 1 further comprising an update unit which detects rotation information on the image currently displayed on the display when the images are rotated on the display, and updates the contents of the second rotation information in the second storage unit with the detected rotation information.

3. The touch panel input coordinate transform device of claim 1, wherein each of the contents of the first rotation information and the contents of the second rotation information includes a rotation angle for rotating images displayed on the display.

4. A method of transforming a touch panel input coordinate comprising:

registering, in an origin register unit, information of an origin of a touch panel as origin information;

storing, in a first storage unit, first rotation information based on images displayed on a display when the origin of the touch panel is registered;

transforming physical coordinates touched on the touch panel into first logical coordinates using the origin information, rotating the displayed images;

storing in a second storage unit second rotation information based on the images currently displayed on the display;

comparing the first rotation information with the second rotation information stored in the second storage unit when a touch operation is performed onto the touch panel, and determining a difference between the first rotation information and the second rotation information; and transforming the first logical coordinates into second logical coordinates, on the basis of the difference, when the contents of the first rotation information are different from the contents of the second rotation information; and supplying the second logical coordinates to an input control unit.

5. The method of transforming a touch panel input coordinate of claim 4, further comprising:

detecting rotation information on the image currently displayed on the display when the images are rotated on the display; and updating the contents of the second rotation information in the second storage unit with the detected rotation information.

6. The method of transforming a touch panel input coordinate of claim 4, wherein each of the contents of the first rotation information and the contents of the second rotation information includes a rotation angle with which images displayed on the display are rotated.

7. A recording medium readable by a computer, embodying a program of instructions executable by the computer to perform a method of transforming a touch panel input coordinate comprising:

registering, in an origin register unit, information of an origin of a touch panel;

storing, in a first storage unit, first rotation information on images displayed on a display when the origin of the touch panel is registered;

transforming physical coordinates touched on the touch panel into first logical coordinates using the origin information;

storing in a second storage unit second rotation information based on the images currently displayed on the display;

comparing the first rotation information with the second rotation information when a touch operation is performed onto the touch panel, and determining a difference between the first rotation information and the second rotation information;

transforming the first logical coordinates into second logical coordinates, on the basis of the difference when the contents of the first rotation information is different from the contents of the second rotation information and supplying the second logical coordinates to an input control unit.

8. A touch panel input coordinate transform device comprising:

means for registering an origin of a touch panel as origin information;

means for storing first rotation information based on an image displayed on a display when the origin of a touch panel is registered;

means for transforming physical coordinates touched on the touch panel into first logical coordinates using the origin information;

means for rotating the image;

means for storing second rotation information based on the image currently displayed on the display;

means for comparing said first rotation information with said second rotation information, when a touch operation is performed to the touch panel, and for determining a difference between said first rotation information and said second rotation information; and means for transforming, when the first rotation information is different from the second rotation information, the first logical coordinates into second logical coordinates on the basis of the difference; and means for supplying the second logical coordinates to an input control unit.

9. The touch panel input coordinate transform device of claim 8, further comprising update means for detecting rotation information on the image currently displayed on the display when the images are rotated on the display, and updating the contents of the second rotation information with the detected rotation information.

10. The touch panel input coordinate transform device of claim 3, wherein each of the first rotation information and the second rotation information includes a rotation angle for rotating images displayed on the display.

* * * * *